United States Patent [19]

Ennis

[11] Patent Number: 4,830,480
[45] Date of Patent: May 16, 1989

[54] TINT DISPLAY DEVICE

[75] Inventor: Jan S. Ennis, Redmond, Wash.

[73] Assignee: Ennco Optical, Inc., Bellevue, Wash.

[21] Appl. No.: 174,727

[22] Filed: Mar. 29, 1988

[51] Int. Cl.⁴ .......................... G02C 1/00; A47F 7/02
[52] U.S. Cl. ............................. 351/158; 248/DIG. 2; 211/13
[58] Field of Search ...................... 351/158, 227, 231; 211/13; 248/DIG. 2

[56] References Cited

U.S. PATENT DOCUMENTS 3,351,208  11/1967  Siegel .............................. 248/DIG. 2
3,924,750  12/1975  Dunchock ...................... 248/DIG. 2

Primary Examiner—Bruce Y. Arnold
Assistant Examiner—P. M. Dzierzynski
Attorney, Agent, or Firm—Graybeal, Jensen & Puntigam

[57] ABSTRACT

A display device for tinted lenses or the like, including a relatively stationary display device for interacting with a display member, 18 and 20, which holds a pair of spectacles in position for observation by the prospective buyer and yet allows display and storage within the saddle device, 10.

3 Claims, 1 Drawing Sheet

U.S. Patent
May 16, 1989
4,830,480
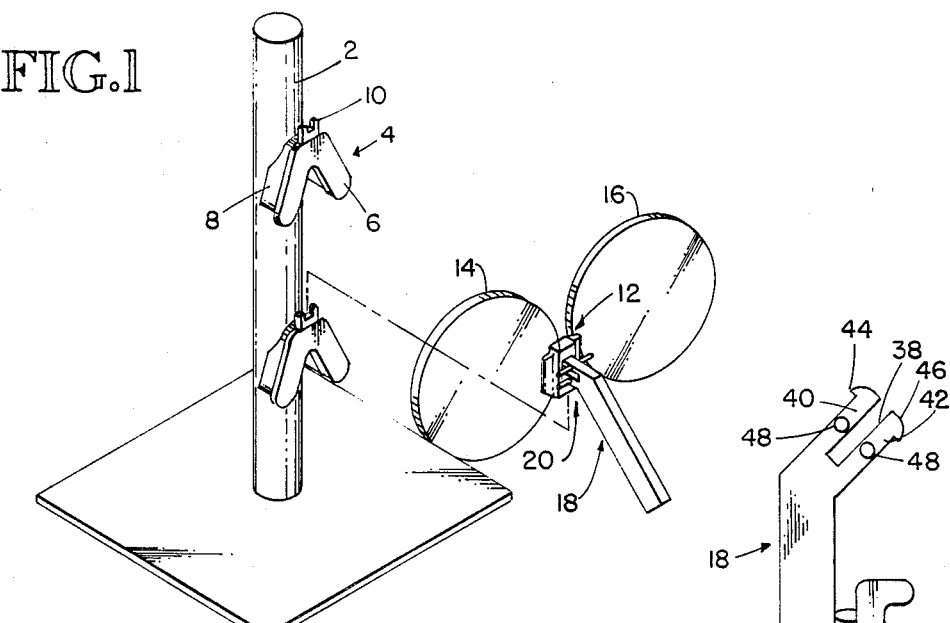
FIG.1
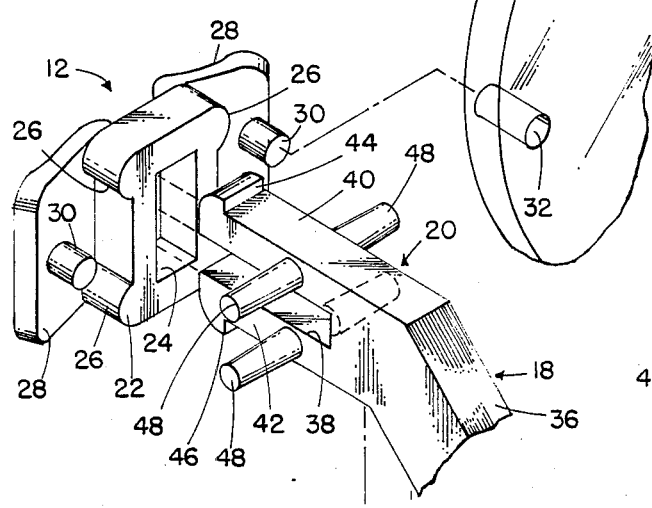
FIG.2
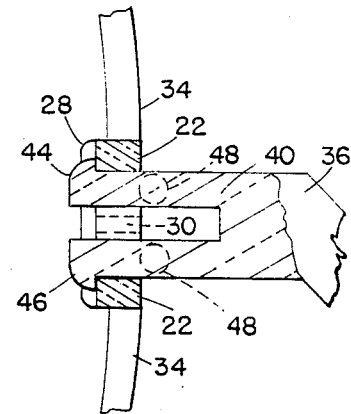
FIG.4
FIG.3

TINT DISPLAY DEVICE

TECHNICAL FIELD

This invention relates to a display device for optical instruments and, more particularly, to a system enabling the convenient and inexpensive display of tinted lenses or the like, wherein the customer is able to "try on" the lenses.

BACKGROUND ART

Corrective lenses have moved from the mere function of correcting eyesight to a fashion statement, not only have the size and shapes of the frames become critical but also the size, shapes, and tint of the lenses have become increasingly important to a person who is concerned about their total appearance as complemented by corrective lenses.

Since the ultimate decision in terms of tint and/or shape of lens actually requires that the lens be placed in proximity of the eyes such capability is a requirement. It would be extremely expensive for the vendor to have all of the possible tints and/or shapes in conjunction with a similar or even greater variety of styles and shapes of frames.

It is, therefore, important and convenient that a pair of tinted spectacles be available for easy handling by the prospective customer and capable of being placed adjacent the nose and eyes without undue handling by the customer or expense on the part of its vendor.

It is with this object in mind, that a prospective purchaser be able to conveniently make a selection that the present device was fabricated.

DISCLOSURE OF INVENTION

With the above-noted objectives and prior art in mind it is an object of the present invention to provide a device for interaction with a display stand for conveniently displaying an eyeglass frame or a pair of lenses secured to a handle means whereby the lenses can be easily picked off the stand and placed adjacent to the spectacle-buyer's face to aid in making the appropriate selection.

It is another object of the present invention to provide a display device for a pair of spectacle lenses while at the same time providing a handle for the convenient manipulation of said lenses by a prospective purchaser.

It is still another object of the present invention to provide eyeglass frame display stand which is specifically adapted to cooperate with the handle means, securing a pair of spectacle lenses such that the lenses may be easily set upon and removed from the display stand.

It is still a further object of the present invention to provide an interactive display device wherein the mating of the various elements of the display device serve to both secure the individual lenses in position and further, to display them in approximately the same relative position they would hold if mounted in an eyeglass frame while likewise securing a convenient handle member for manipulation.

BRIEF DESCRIPTION OF THE DRAWINGS

FIG. 1 is an environmental view showing the relationship between the relatively fixed eyeglass frame display device and the removable tint display holder.

FIG. 2 is an exploded enlarged view of the interaction of the various elements of the tint display holder as well as the receiving saddle of the display device.

FIG. 3 has a vertical sectional view illustrating the display handle in its secured position in conjunction with an eyeglass lens.

FIG. 4 is a plan view depicting the lens display handle, as manufactured, including the integral display receiving saddle.

BEST MODE FOR CARRYING OUT THE INVENTION

As seen in FIG. 1, the display device can include any sort of a vertical rod or the equivalent 2 to which a nose piece holder 4 is secured. It is to be noted that the nosepiece holder 4 includes a laterally projecting face-plate 6 and a rearwardly extending support saddle 8. It is to be noted that the plate member 6 and the support saddle 8 are essentially of an inverted "V" configuration. Mounted to the upper portion of the plate 6 is a handle receiving saddle member 10 to be described in greater detail hereinafter.

For interaction with the display device just described, there is provided a lens securing handle including a configured backing element 12 for interaction with a pair of lenses 14 and 16 and an outwardly projecting handle member 18 having a nose portion 20 configured for intimate inter-relationship with the backing-plate 12. In this configuration the display device is suitable for displaying eyeglass frames.

Referring now to FIG. 2, wherein the device can be seen in greater detail, it is to be noted that the backing member 12 includes a main body portion 22 which is generally of rectangular configuration having a rectangular opening 24 extending there through and having outwardly projecting curved corners 26, as will be explained hereinafter, serving as a guide and support for the attached lenses 14, 16. A pair of outwardly extending, relatively flexible wings 28 are secured to one side of the rectangular main body member 22 said wings being relatively flat and each one having a forwardly projecting peg or pin 30 for interaction with a bored hole 32 and a lens 34.

The handle number 18 includes an angled handle portion 36 and a head portion 20 integral therewith. The forward, or nose portion of the head 20 includes an elongated slot 38 dividing the head into a bifurcated nose-piece having legs 40 and 42. Each of said legs 40 and 42 include an outwardly flared locking member 44 and 46 such that the legs 40 and 42 can be inserted into the opening 24 of the member 12 and will by memory expand outwardly locking them in position.

A pair of outwardly projecting pin members, 48 project laterally outwardly from each of the legs 40 and 42 such that when a lens 34 is placed upon pin 30 and the head 20 of the handle member is snapped into position the pegs or pins 48 hold the lens in position.

In use, the handle and attached pair of lenses rest in a saddle-like member 10 which includes an upwardly projecting "U" shape main body portion having a base 50 and arms 52 defining a slot 54 for receiving the handle member 18. The saddle member 10 is secured to a display device by an adhesive applied to a downwardly projecting foot 56.

Referring now to FIG. 3, a vertical section of the device in use, the inter-relationship of the various parts maybe seen with the tabs 44 and 46 being locked behind the upper and lower portions of main body member 22 the outwardly projecting pin 48 securing one side of the lenses 34 while the other side is secured by wing-type member 28 and the final securement being the pin 30 which as explained hereinabove projects through bore 32 in the lens 34.

Reference is now had to FIG. 4 wherein the handle and head member generally designated as 18 is shown as it emerges from the mold and it is to be noted that the saddle member 10 is an integral portion of this molded element to be broken off and secured to the display device as described hereinabove.

It is to be noted that the present invention contemplates a simple, inexpensive, and convenient novel method of mounting spectacle lenses to display their tint or the like.

What I claim is:

1. A display device for use with tinted lenses or the like comprising:
   support means,
   at least one display assembly secured to said support means comprising a nose piece adapted to display eyeglass frame or tint display for easy access and removability and comprising an inverted v-shaped rear portion secured to the support means for supporting an eyeglass frame or tint display and an upwardly and outwardly extending flange at the front of said support member, said flange including an upwardly open cradle for accepting the tint display at the upper central portion off the flange tint display means adapted to interact with the display assembly including an elongated handle member including a long leg and an obtuse angle to the short leg, said short leg including a lens supporting pad at its outer end, said lens supporting pad adapted to interact with and support a pair of lenses, approximating the relative position occupied when installed within a frame.

2. A tint display means for displaying a pair of tinted lenses said display means comprising:
   a handle member including a long leg at an obtuse angle to an integral short leg, said short leg terminating at its outer end with a contoured pad to complement the curve of an eyeglass lens, and
   a locking member which is snapped into place locking the lens in position.

3. A tint display as in claim 2 wherein the lens is held in position by pin integral with the tint display means extending through the lens.

* * * * *